Jan. 29, 1952 V. R. PAWELSKY ET AL 2,583,795
THERMOELECTRIC GAS VALVE
Filed Feb. 28, 1946 2 SHEETS—SHEET 1

INVENTORS
VERNON R. PAWELSKY
LOURDES V. McCARTY
CEDRIC E. ZARWELL
By John W. Michael
ATTORNEY Jan. 29, 1952　　V. R. PAWELSKY ET AL　　2,583,795
THERMOELECTRIC GAS VALVE
Filed Feb. 28, 1946　　2 SHEETS—SHEET 2

INVENTORS
VERNON R. PAWELSKY
LOURDES V. McCARTY
CEDRIC E. ZARWELL
BY John W. Michael
ATTORNEY Patented Jan. 29, 1952

2,583,795

UNITED STATES PATENT OFFICE 2,583,795

THERMOELECTRIC GAS VALVE

Vernon R. Pawelsky, Lourdes V. McCarty, and Cedric E. Zarwell, Milwaukee, Wis., assignors to A P Controls Corporation, a corporation of Wisconsin Application February 28, 1946, Serial No. 651,010

8 Claims. (Cl. 137—139)

This invention relates to improvements in valves controlling the flow of gases and particularly to a gas valve which is readily controllable responsive to a condition remote from the valve itself.

It is one object of the present invention to provide a gas valve which is readily operable by means rapidly responsive to a condition in a location remote from the valve and providing a small but powerful movement.

Another object of the invention is to provide a gas valve in which the relatively small movement of the motor means is multiplied by the action of a leverage from the valve actuating means.

Another object of the invention is to provide a gas valve which is an entirely self-contained structure including both operating mechanism or motor means and valve supporting and actuating means activated by the operating mechanism.

Another object of the invention is to provide a gas valve with motor means inclosed in a chamber open to atmosphere and sealed into the wall of the gas-receiving chamber of the structure with the sole moving element of the motor means wholly within the latter chamber.

Another object of the invention is to provide a gas valve in which valve movement initially lags behind or is unaffected by movement of the motor means, but after the initial opening of the valve completes the valve opening movement with substantially a snap action.

And a further object is to provide a gas valve constructed from a minimum number of readily assembled parts and with but a single adjustment for varying the degree of opening of the valve.

Objects and advantages, other than those above set forth, will be apparent from the following description when read in connection with the accompanying drawings, in which.

Figure 1:
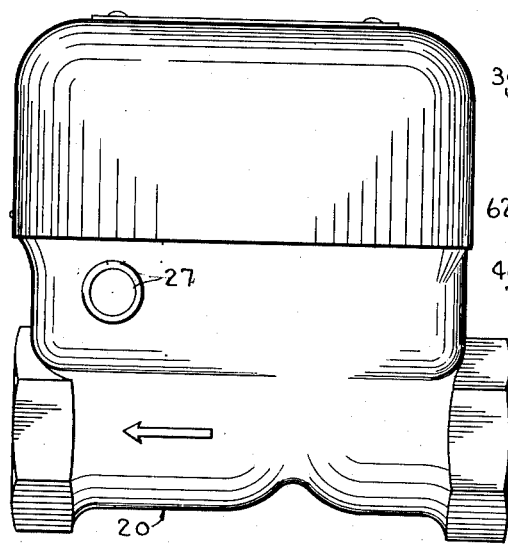
Fig. 1 is a side elevation of the complete structure.
Figure 2:
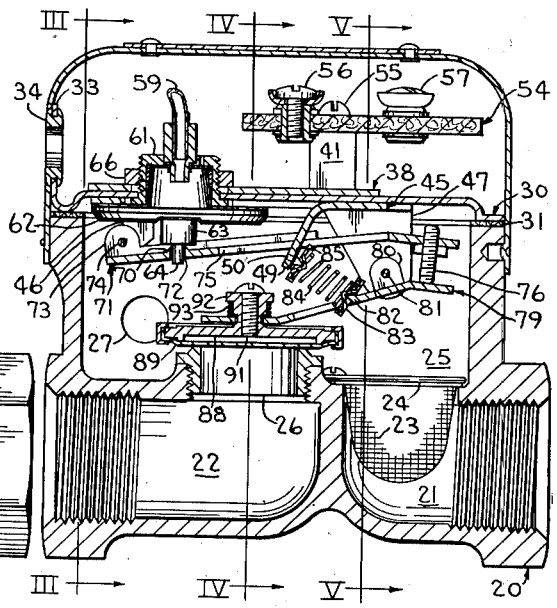
Fig. 2 is a cross section taken on a central vertical plane longitudinally of Fig. 1.
Figure 3:
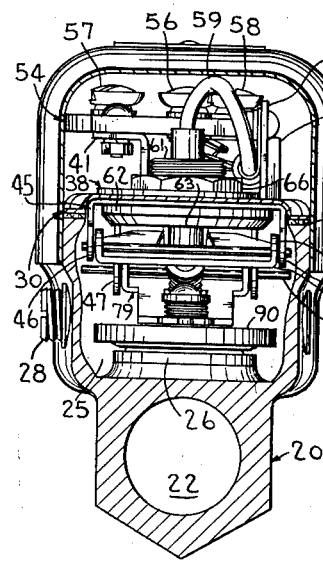
Fig. 3 is a vertical cross section taken on the plane of line III—III of Fig. 2.
Figure 4:
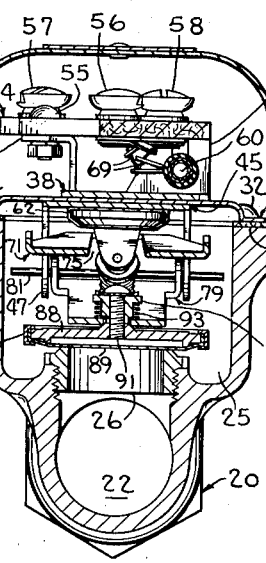
Fig. 4 is a vertical cross section taken on the plane of line IV—IV of Fig. 2.
Figure 5:
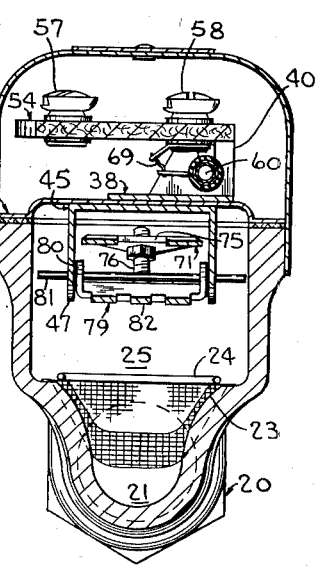
Fig. 5 is a vertical cross section taken on the plane of line V—V of Fig. 2.
Figure 16:
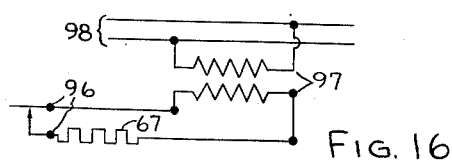
Fig. 16 is a diagram of the electrical connection of the motor means and of a control therefor.
Figures 6, 7:
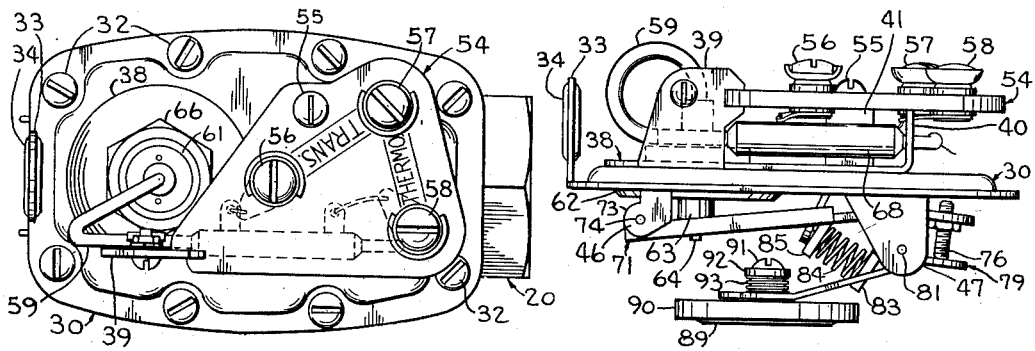
Fig. 6 is a top plan view of the device with removal of the cover defining the chamber inclosing portions of the motor mechanism.
Fig. 7 is a side elevation of the valve, its supporting leverage, and the operating mechanism or motor means for such leverage.
Figure 8:
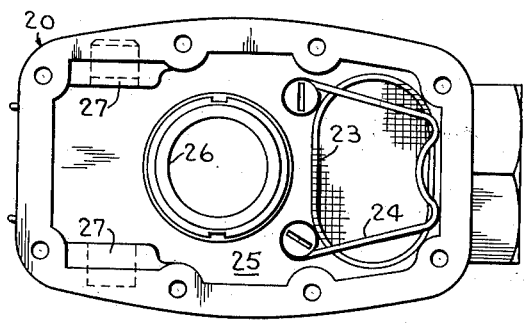
Fig. 8 is a top plan view of the casing with all of the internal mechanism removed therefrom.

Generally, the present structure includes a casing with inlet and outlet passages having a connecting port providing a seat for a valve. The valve is floatingly mounted on a supporting and actuating leverage biased into predetermined relationship by a spring and having an adjusting means between the separate levers. Motor means for actuating the leverage includes an expansible chamber filled with an expansible fluid and mounted in a partition defining the chamber through which the gas flows. The fluid in the motor means is expansible responsive to energization of a heater controlled from a point remote relative to the valve and the fluid containing volumes of the several portions of the motor means are so selected as to provide quick expansion and contraction of the expansible fluid within the range of temperature provided by a remotely controlled heater. The motor means and the leverage actuating the valve are securely supported in brackets fixed to the casing partition which minimizes and simplifies the number of parts required and the assembling and adjusting operation.

Referring in detail to the drawings, numeral 20 generally designates a casing formed with an inlet passage 21 and an outlet passage 22 to which conduits for supply and delivery of a gas are to be connected. The inlet passage receives a screen 23 held in place against the pressure of the gas by a clamp or retainer 24. The inlet and outlet passages communicate with one casing chamber 25 partially defined by the casing and formed with a port from the chamber into the outlet passage. The wall defining the port is preferably threaded to receive a threaded ring 26 having one end highly finished as a plane surface to provide a replaceable seat for the valve described below. The chamber may be provided with holes, indicated at 27, in which another outlet conduit may be connected as for constant and uncontrolled supply of gas to the pilot flame of a burner and such holes may be suitably plugged, as indicated at 28, when not in use.

Figure 11:
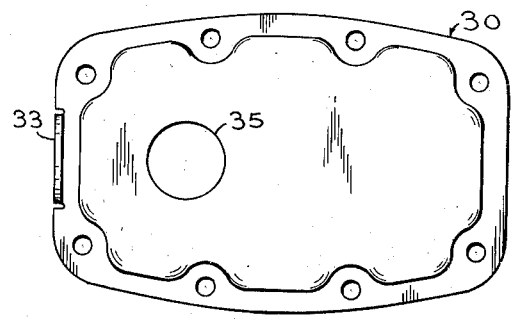
Fig. 11 is a bottom view of the plate supporting all of the valve operating mechanism.

The chamber 25 is closed and completely defined by a plate 30 (see Fig. 11) formed to seat on a gasket 31 on the edge of the casing and drawn thereto, in a gas-tight relation, by screws 32. One end of the plate 30 is struck up from the plate body to form an ear 33 with an aperture and is provided with a grommet 34 through which electric conductors pass to valve motor means to be described. The plate body is slightly arched to increase the stiffness thereof and has only a single aperture 35 therethrough for a purpose which will appear below.

The plate has mounted on the side thereof externally of the chamber 25, a bracket or supporting member (see Fig. 10) which comprises a base portion 38 with a plurality of lugs 39, 40, 41 extending therefrom. The lugs 39 and 40 are notched and the lugs 39 and 41 are formed with apertures, as shown, to provide means for mounting other portions of the structure, as will be apparent from the drawing. The bracket body 38 is provided with a single aperture 42 designed to register with the partition hole 35 when the bracket is mounted on the plate, as particularly shown in Fig. 9.

Figure 9:
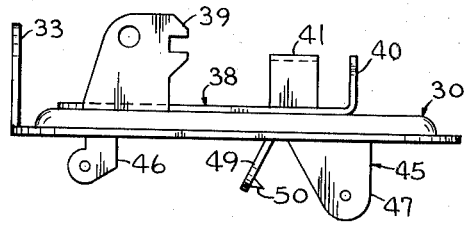
Fig. 9 is a side elevation of the stationary internal structure on which all of the movable portions of the mechanism are supported.
Figure 10:
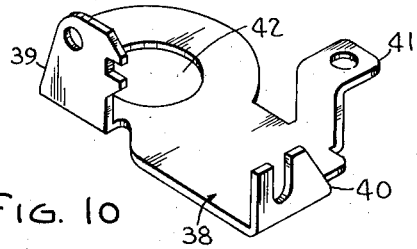
Fig. 10 is a perspective view of a portion of the structure shown in Fig. 9.
Figure 12:
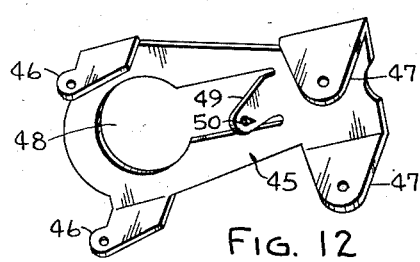
Fig. 12 is a perspective view of one of the stationary supporting parts shown in Fig. 9.

A second bracket or support (see Fig. 12) is formed with a body portion 45 from which differently spaced ears 46 and 47 extend at an angle to the bracket body, each pair of ears being formed with aligned holes. A hole 48 is also formed in the bracket body 45 to register with the partition hole 35 and the top or first bracket hole 42 when the second bracket is mounted, as shown in Fig. 9, on the side of the plate 30 forming a surface of the chamber 25. A finger 49 is struck from the bracket 45 to extend downwardly from the bracket body and the plate 30, when the parts are assembled, and is provided with a pointed stud 50 substantially on the center line of the assembled parts.

A board 54 of electrically insulating material is entered in the notch of the first bracket lug 39 and rests on the lugs 40 and 41 of such bracket and is fastened to the lug 41 by a bolt and nut, indicated at 55. A plurality of binding posts or terminals 56, 57, and 58 are mounted on the board to provide connections for electrical conductors, as will appear from the diagram of connections.

A motor or operating means is mounted in part on the first bracket 38 and in part on the plate 30 and in the registering holes in the plate and the two brackets. Such motor means comprises a tube 59 closed at one end and having an enlarged chamber 60 formed therein. It will be seen that chamber 60 may contain a materially greater volume than a equivalent length of the remainder of the tube. The tube is fixed at the other end in a flanged cup-like member 61 with a resilient diaphragm 62 secured to the cup flange and coacting therewith to form a closed expansible chamber designed to be filled with a fluid whose vapor pressure increases greatly when the fluid is heated above a critical value. The diaphragm 62 has projecting therefrom a boss 63 with a reduced end portion or pin 64, thus providing a shoulder for a purpose to be described. The closed end of the tube is mounted in the notch in the bracket lug 40 and is mounted by a suitable clip on the bracket lug 39. The tube is bent so that the cup 61 may be mounted in the registering partition and bracket holes 35, 42, and 48, and the cup is fixed to the plate and brackets by a nut 66 clamping the cup in sealed gas-tight relation in the partition. The tube chamber 60 is coated with a heat conductive and resistive material such as an enamel and an electrical resistor 67 is then preferably wound directly on the enameled surface of the chamber. The resistor or heater is preferably of the type which heats and cools rapidly and the coils thereof are embedded in a suitable electrical insulating material indicated at 68, insulation being preferably coated with an electrical insulating and heating resistive enamel. The electrical conductors 69 connected with the heater are severally connected with the terminals 56 and 58.

Figure 13:
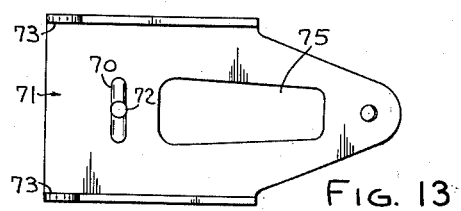
Fig. 13 is a plan view of one of the leverage parts.
Figure 14:
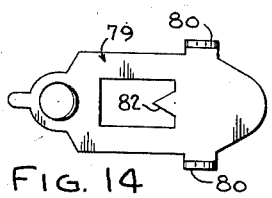
Fig. 14 is a plan view of another leverage part.
Figure 15:
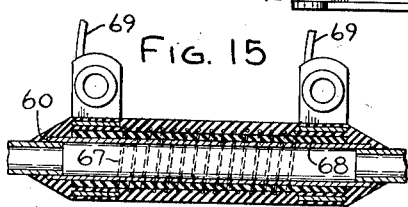
Fig. 15 is a longitudinal cross section through a portion of the motor means for operating the valve.

The shoulder of diaphragm boss 63 is adapted to engage on an arcuate surface 70 formed on a lever 71 (see Fig. 13) and the boss pin 64 is of such size as to extend through a hole 72 in such lever. The lever is formed with a pair of ears 73 spaced to be received between the second bracket ears 46 and to be pivoted thereto by a pin 74. A slot 75 is cut into the lever 71 for the extension therethrough of the finger 49 of the second bracket and the end of the slot is provided with adjustable means 76. A second lever 79 (see Fig. 14) is formed with a pair of ears 80 spaced to be received between the pair of ears 47 on the second bracket and to be pivoted thereto by a pin 81. The lever 79 is slotted and the end of the slot is formed with a pointed projection 82 to provide a bearing for a spring seat 83 supporting one end of a spring 84, the other end of the spring resting in a seat 85 supported on the pointed end of the stud 50 projecting from the second bracket. A valve member is mounted on one end of the lever 79 and includes a flanged disc 88 with a flexible and preferably non-metallic diaphragm 89 so held on the disc by a retaining ring 90 as to provide a slightly tensioned but otherwise unsupported surface for contact with the valve seat. A screw 91 passes through the lever 79 and into the valve backing disc and supports a flanged collar 92 surrounded by a spring 93 acting between the lever and the flange of the collar. It will be seen that a considerable clearance is left between all adjacent surfaces of the lever 79 and collar 92 so that material play exists between such parts. Hence the valve is floatingly or non-rigidly mounted in the lever.

In use, assuming that the present valve controls the flow of gas to a fuel burner and is to be thermostatically controlled, the electrical heater 67 is connected by way of a thermally responsive switch 96 and a transformer 97 to a suitable source of electrical current indicated at 98. The thermostatic switch or thermostat may be placed in a space in which the temperature is to be controlled and as remote from the valve as desired. So long as the space does not require heat and the switch contacts are open, the heater 67 remains unenergized and the expansive fluid in the motor means is not heated and therefore is contracted to a relatively small volume. The valve 88—93 is then seated as shown. When the space containing the thermostat 96 requires heat, the switch contacts close and the heater is energized, thereby heating the expansive fluid in the motor means and flexing the diaphragm outwardly. The diaphragm boss 63 then presses on the lever 71 which swings about its pivot and acts by way of the adjustment 76 on one end of the lever 79. The lever 79 is then swing about its pivot against the resistance of the spring 84 and the valve 88—93 is lifted off its seat. Gas then flows through the valve casing until both the electric heater and the expansive fluid in the motor means have been cooled sufficiently, after the demand for heat is satisfied and thermostat 96 reopens its contacts, so that the diaphragm may re-flex to its original position whereupon the spring 84 closes the valve 88—93.

In the above construction the motor means are solidly charged with a liquid. Hence the expansion occurring below the vaporization point of the charge at its then pressure is not material but above such vaporization point the larger volume in the chamber is expelled therefrom and rapidly raises the pressure on the diaphragm which flexes outwardly with a snap action. Such movement acts on the leverage which lifts by the amount of the clearance between the end lever and the valve collar. Thus the valve is subjected to an impact when the clearance has been taken up which impact "cracks" the valve open. Such slight opening of the valve quickly allows equalization of the pressure on the two sides of the valve and opening for the full distance then follows with a snap action. The resistance of the spring to valve opening diminishes as the valve is opened since the component of spring force normal to the lever decreases as the valve opens and the spring and the lever approach parallelism. Conversely, the spring action increases as the valve closes, thus also providing a rapidly accelerated or snap action closing.

The volume of the expansible fluid in the heater chamber is so much greater than the volume in the adjacent portions of the tube that expansion in the tube is negligible. The resistor is of the type in which the resistance increases rapidly with the temperature so that the lag between closing of the thermostat contacts and valve opening is negligible being of the order of thirty seconds. The volume of the insulation about the resistor is kept as small as consistent with electrical safety, thus minimizing heat storage which allows cooling of the resistor and expansion of the liquid into the heater chamber in a time approximately the same as the heating period.

Although but one embodiment of the present invention has been illustrated and described it will be apparent to those skilled in the art that various changes and modifications may be made therein without departing from the spirit of the invention or from the scope of the appended claims.

We claim:

1. In a device controlling the flow of a fluid, a casing having inlet and outlet passages, a valve controlling communication between the passages, a plate mounted on the casing and coacting therewith to define a chamber therein, a bracket mounted on the plate, a plurality of interacting levers severally mounted on the bracket for supporting and actuating the valve, a spring mounted between one of said levers and an abutment provided therefor, with the force of the spring applied to the lever along a line at all times inclined with respect thereto and so arranged that said line and lever approach parallelism as the valve moves from its seat whereby the force of the spring acting on said lever increases as the valve moves towards its seat, and motor means acting in opposition to and cooperating with the spring to cause snap acting seating or unseating movement of the valve.

2. In a device controlling the flow of a fluid, a casing having inlet and outlet passages, a valve controlling communication between the passages, a plate mounted on the casing and coacting therewith to define a chamber therein, a bracket mounted on the plate, a plurality of interacting multiplying levers severally mounted on the bracket for supporting and actuating the valve, a spring mounted between one of said levers and an abutment provided therefor, with the force of the spring applied to the lever along a line at all times inclined with respect thereto and so arranged that the component of force normal to said one lever decreases as the valve moves from its seat and increases as the valve moves towards its seat, and motor means acting on the levers and cooperating with said spring for causing movement of said one lever to open or seat the valve with a snap action.

3. In a device controlling the flow of a fluid, a casing having inlet and outlet passages, a plate mounted on the casing and coacting therewith to define a chamber therein, a bracket mounted on the plate, a plurality of levers severally mounted on the bracket, one of the levers supporting a valve controlling flow through the chamber, an adjustable stud mounted in one end of the other of the levers and bearing on one end of the said one of the levers, a spring acting on the said one of the levers and urging the levers into a predetermined relation to seat the valve, and expansive motor means acting on one end of the said other of the levers for actuating the leverage and the valve, the motor means including an expansive chamber having an expansive fluid therein, and a heater acting to expand the fluid in the chamber, the heater being energized responsive to a condition remote from the device.

4. In a fluid flow control device, a chamber having an inlet and an outlet, a lever system actuating a resiliently mounted valve controlling flow of fluid through the chamber, a spring acting on the lever system and continuously urging the valve toward its seated position, means mounting said spring in operative relation to a lever of said system with one end of the spring exerting a force on said lever along a line inclined thereto, said line of force acting in a direction to create a component of force normal to said lever which component of force increases as the valve moves to its closed position and decreases as the valve moves to open position, and temperature responsive motor means actuating said leverage system.

5. In a device for controlling flow of fluid fuel to a heater, a chamber having inlet and outlet passages, a valve controlling flow of fuel from the outlet and urged by inlet fuel pressure to its seated position, a leverage system resiliently mounting the valve and controlling movement thereof, said leverage system including a lever, a spring, means mounting the spring operatively with respect to said lever and including an abutment on which one end of the spring is supported, the other end of the spring being operative on said lever and continuously tending to seat the valve said spring being disposed with its line of action inclined to said lever to exert a varying force thereon, said force increasing as the valve approaches its seated position, and a snap acting diaphragm actuated in accordance with heat demand of the heated medium and acting on the leverage system to control movement of the valve.

6. In a device controlling the flow of a fluid, a chamber having inlet and outlet passages, a pair of levers mounted in the chamber, one of the levers resiliently supporting a valve controlling flow of fluid from the chamber, a spring, means mounting said spring in operative relation with respect to one of said levers and including an abutment on which one end of the spring is supported, the other end of said spring acting on said one lever to continuously urge the valve to its seated position, said spring being disposed with its line of action inclined to said lever and arranged to exert an increasing force thereon as the valve approaches its seated position, and temperature responsive motor means acting on the other of said levers for actuating movement of the leverage and the valve, the valve movement being greater than that of the motor means.

7. In a device controlling the flow of a fluid, a chamber having an inlet and an outlet, a pair of interacting multiplying levers mounted in the chamber, one of the levers resiliently supporting a valve controlling flow of fluid from the chamber, a spring, means mounting the spring operatively with respect to one of said levers including an abutment on which one end of said spring is supported, the other end of said spring being operative on said lever and continuously urging the valve to its seated position with a varying force, the spring being disposed in an inclined position with respect to said lever to exert a maximum force on said lever as the valve approaches seating position and to exert a decreasing force thereon as the valve leaves its seated position, adjustable means acting between the levers for regulating the position of the valve with respect to its seat, and motor means acting to move the levers toward parallelism and unseat the valve in response to a temperature condition.

8. In a device for controlling the flow of a fluid, a casing having an inlet and an outlet, a first lever pivotally mounted in said casing, a valve mounted on one end of said lever and adapted to control flow from the outlet, a second lever having one end pivotally mounted in said casing and its other end overlying and acting on said first lever, a spring, means mounting said spring in operative relation with respect to said first lever, said spring being disposed with its line of action inclined with respect to said first lever and operative thereon to continuously urge said valve to its seat on said outlet, and a diaphragm acting on said second lever to open said valve in response to a temperature condition, the force component of said spring normal to said first lever continuously decreasing as said valve moves from its seat.

VERNON R. PAWELSKY.
LOURDES V. McCARTY.
CEDRIC E. ZARWELL.

REFERENCES CITED

The following references are of record in the file of this patent:

UNITED STATES PATENTS

| Number | Name | Date |
|---|---|---|
| 1,085,078 | Barrington | Jan. 20, 1914 |
| 1,509,928 | Breeds | Sept. 30, 1924 |
| 1,643,858 | Sauvage | Sept. 27, 1927 |
| 1,814,812 | Klees | July 14, 1931 |
| 1,967,981 | Thomas | July 24, 1934 |
| 2,074,526 | Williams | Mar. 23, 1937 |
| 2,085,300 | Dillman | June 29, 1937 |
| 2,142,903 | King | Jan. 3, 1939 |
| 2,317,063 | Johnson | Apr. 20, 1943 |